United States Patent
Kong et al.

(10) Patent No.: US 10,663,953 B2
(45) Date of Patent: May 26, 2020

(54) TRANSMISSION SYSTEM FOR CONVERTING SIGNAL OF 9-CHANNEL ENCODER INTO 1000MBPS PHY SIGNAL

(71) Applicants: HARBIN BO QIANG ROBOT TECHNOLOGY CO., LTD., Harbin (CN); HARBIN INSTITUTE OF TECHNOLOGY, Harbin (CN)

(72) Inventors: Minxiu Kong, Harbin (CN); Wenbiao Zhou, Harbin (CN); Yanqin Zhang, Harbin (CN)

( * ) Notice: Subject to any disclaimer, the term of this patent is extended or adjusted under 35 U.S.C. 154(b) by 29 days.

(21) Appl. No.: 16/052,627

(22) Filed: Aug. 2, 2018

(65) Prior Publication Data
US 2018/0341251 A1 Nov. 29, 2018

Related U.S. Application Data

(63) Continuation of application No. PCT/CN2016/000284, filed on May 27, 2016.

(30) Foreign Application Priority Data

Feb. 5, 2016 (CN) .......................... 2016 1 0081951
Feb. 5, 2016 (CN) ...................... 2016 2 0117021 U

(51) Int. Cl.
G05B 19/416 (2006.01)
B25J 9/16 (2006.01)
H04L 29/06 (2006.01)

(52) U.S. Cl.
CPC .......... *G05B 19/416* (2013.01); *B25J 9/1628* (2013.01); *H04L 69/08* (2013.01)

(58) Field of Classification Search
CPC ....... G05B 19/416; B25J 9/1628; H04L 69/08
See application file for complete search history.

(56) References Cited

U.S. PATENT DOCUMENTS 5,673,130 A * 9/1997 Sundstrom ............ H04L 7/0008
  375/293
6,240,274 B1 * 5/2001 Izadpanah ............. H04J 3/0685
  370/277

(Continued)

FOREIGN PATENT DOCUMENTS

CN 101335738 A 12/2008
CN 104935587 A 9/2015

(Continued)

OTHER PUBLICATIONS

Internation Search Report of PCT/CN2016/000284, dated Jan. 24, 2017.

*Primary Examiner* — Henry Tsai
*Assistant Examiner* — John B Roche
(74) *Attorney, Agent, or Firm* — Erson IP (Nelson IP)

(57) ABSTRACT

A transmission system for converting a signal of a 9-channel encoder into a 1000 Mbps PHY signal, includes a PHY chip circuits U1 and U2, digital photocouplers U3~U11, 485 transceivers U12~U20, RJ45 isolation transformer-integrated jacks J1 and J2, a field programmable gate array (FPGA) chip circuit, an electronic propulsion control system (EPCS) configuration chip circuit, a Jtag interface and SM-6P-PCB jackets J3~J11, wherein two-channel MII digital signal output and input ends of the FPGA chip circuit are respectively connected with MII digital signal input and output ends of the PHY chip circuits U1 and U2; differential data signal output and input ends of the PHY chip circuits U1 and U2 are respectively connected to the RJ45 isolation transformer-integrated jacks J1 and J2, and a master station and a slave station are arranged at the same time.

2 Claims, 2 Drawing Sheets

(56) References Cited

U.S. PATENT DOCUMENTS 6,675,156 B1 1/2004 McIntyre et al.
2003/0009242 A1* 1/2003 Bocchi ............... G05B 19/4142
700/61

FOREIGN PATENT DOCUMENTS

CN 105554034 A 5/2016
CN 205336322 U 6/2016

* cited by examiner

TRANSMISSION SYSTEM FOR CONVERTING SIGNAL OF 9-CHANNEL ENCODER INTO 1000MBPS PHY SIGNAL

CROSS-REFERENCE TO RELATED APPLICATIONS

This application is a continuation of International Patent Application No. PCT/CN2016/000284 with a filing date of May 27, 2016, designating the United States, now pending, and further claims priority to Chinese Patent Application No. 201610081951.5 with a filing date of Feb. 5, 2016 and Chinese Patent Application No. 201620117021.6 with a filing date of Feb. 5, 2016. The content of the aforementioned applications, including any intervening amendments thereto, are incorporated herein by reference.

TECHNICAL FIELD

The present invention relates to a transmission system for converting a signal of a 9-channel encoder signals into a 1000 Mbps PHY signal and a method for the same, belonging to the technical field of robot data communication protocol conversion.

BACKGROUND OF THE PRESENT INVENTION

There are many existing absolute value encoder transmission protocols, such as an EnDat protocol, a BISS protocol and an RS485 protocol (hereafter also referred to as "485" or "485 protocol"), and most of these protocols follow RS485 and RS422 protocols on hardware. Their transmission rates are limited to their transmission distances, and difficultly achieve the existing speed (2.5 Mbps) when the transmission distance is far. For a multi-axis robot (a robot having 6-9 axes), the above communication manner needs 6-9 4-core cables independent each other for transmission, which is not beneficial to stability of the system, and the price of the cable is relatively expensive. An encoder data transmission manner based on an MAC protocol or other protocols has high delay, and is not adapted to many robot systems having high real-time requirement. In addition, when closed loop control is made in the robot system, encoder position feedback of many bus communication needs three or more periods, which is not beneficial to higher-precision movement control.

SUMMARY OF PRESENT INVENTION

In view of defects of the prior art, the object of the present invention is to provide a transmission system for converting a signal of a 9-channel encoder into a 1000 Mbps PHY signal to overcome problems of poor stability, high signal delay, complicated cable and expensive cost in a process of signal transmission of a robot encoder.

The present invention provides an AlteraFPGA-based encoder data transmission solution for converting a signal (which is compatible to RS485 interface type of absolute value encoders from Panasonic, Tama and the like) of a 9-channel encoder into 1000 MbpsPHY signal transmission, in addition, a one-channel MAC layer transmission circuit is remained to be adapted to a requirement that the controller needs to acquire the position of the encoder in real time, and remaining pins of FPGA are guided out to conveniently expand other functions.

The object of the present invention is achieved by the following technical solution:

A transmission system for converting a signal of a 9-channel encoder into a 1000 Mbps PHY signal includes PHY chip circuits U1 and U2, digital photocouplers U3~U11, 485 transceivers U12~U20, RJ45 isolation transformer-integrated jacks J1 and J2, a field programmable gate array (FPGA) chip circuit, an (electronic propulsion control system (EPCS) configuration chip circuit, a Jtag interface and SM-6P-PCB sockets J3~J11, wherein two-channel MII (Media Independent Interface) digital signal output and input ends of the FPGA chip circuit are respectively connected with Mil digital signal input and output ends of the PHY chip circuits U1 and U2; differential, data signal output and input ends of the PHY chip circuits U1 and U2 are respectively connected to the RJ45 isolation transformer-integrated jacks J1 and J2; first-channel 485 digital signal input and output ends of the FPGA chip circuit are connected with digital signal output and input ends of the 485 transceiver U12 through the digital photocoupler U3, second-channel 485 digital signal input and output ends of the FPGA chip circuit are connected with digital signal output and Input ends of the 485 transceiver U13 through the digital photocoupler U4, third-channel 485 digital signal input and output ends of the FPGA chip circuit are connected with digital signal output and input ends of the 485 transceiver U14 through the digital photocoupler U5, fourth-channel 485 digital signal input and output ends of the FPGA chip circuit are connected with digital signal-output and input ends of the 485 transceiver U15 through the digital photocoupler U6, fifth-channel 485 digital signal input and output ends of the FPGA chip circuit are connected with digital signal output and input ends of the 485 transceiver U16 through the digital photocoupler U7, sixth-channel 485 digital signal input and output ends of the FPGA chip circuit are connected with digital signal outputting/inputting ends of the 485 transceiver U17 through the digital photocoupler U8, seventh-channel 485 digital signal input and output ends of the FPGA chip circuit are connected with digital signal output and input ends of the 485 transceiver U18 through the digital photocoupler U9, eighth-channel 485 digital input and output-ends of the FPGA chip circuit are connected with digital signal output and input ends of the 485 transceiver U19 through the digital photocoupler U10, ninth-channel 485 digital signal input and output ends of the FPGA chip circuit are connected with digital signal output and input ends of the 485 transceiver U20 through the digital photocoupler U11, serial data input and output ends of the FPGA chip circuit are connected with serial data output and input ends of the EPGS configuration chip circuit, and Jtag test data output and input ends of the FPGA chip circuit are connected to the Jtag interface; 485 communication data output and input ends of the 485 transceivers U12~U20 are respectively connected to the SM-6P-PCB jacks J3~J11; and the 485 transceivers UI 2-1.120 adopt an isolated power supply.

Compared with the prior art, the present invention has the beneficial effects that:

1. According to the present invention, an RS485 signal of a multi-channel absolute value encoder may be stably converted into a 1000 Mbps PHY signal for transmission, so as to increase transmission distance and stability of encoder data. Due to achievement of direct connection of an RS485 interface signal and an interface signal on a PHY chip, transmission efficiency is greatly improved, and instantaneity of data transmission and reception is ensured. Meanwhile, a data instruction of a driver and a return instruction of an encoder are detected for position feedback of the encoder, thereby improving refreshing rate of position feedback in closed loop control.

2. By adopting the technical solution of the present invention, transmission distance is properly increased, delay of transmission is greatly reduced, cable cost is omitted, work of field connection is reduced, the stability of the system is increased, and other signals are transmitted according to this protocol. Thus, the present invention can meet transmission requirements of high stability, low delay, long distance and low cost of an industrial robot for encoder data under complicated electronic environment, and meanwhile can also meet a requirement of a high refreshing speed of a robot controller for encoder data.

Wherein, 1—FPGA chip circuit, 2—EPCS configuration chip circuit, 3—Jtag interface.

DETAILED DESCRIPTION OF PREFERRED EMBODIMENTS

Next, the present invention will be described in detail in combination with drawings and embodiments.

Figure 1:
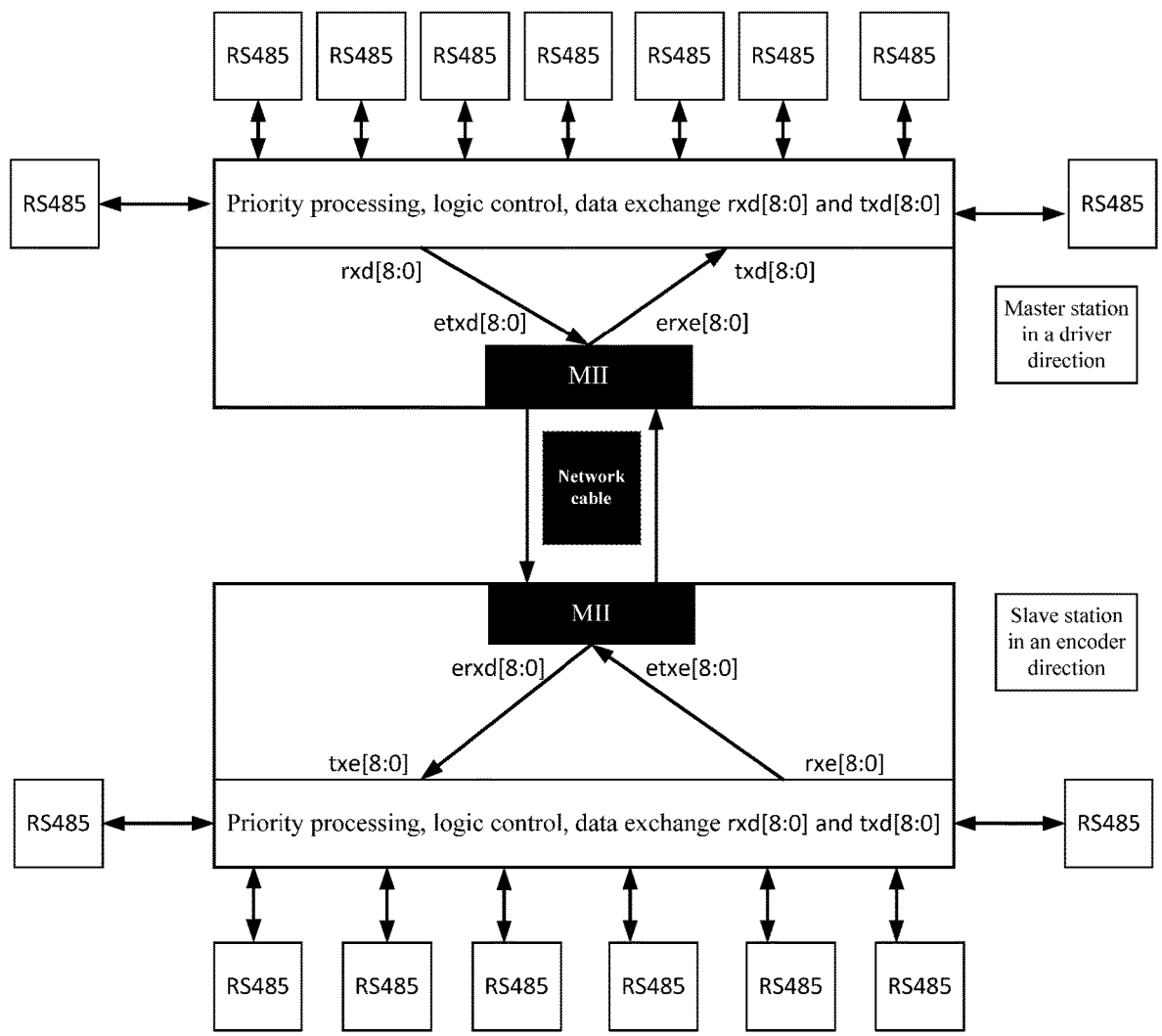
FIG. 1 is a diagram of an entire structure according to the present invention.
Figure 2:
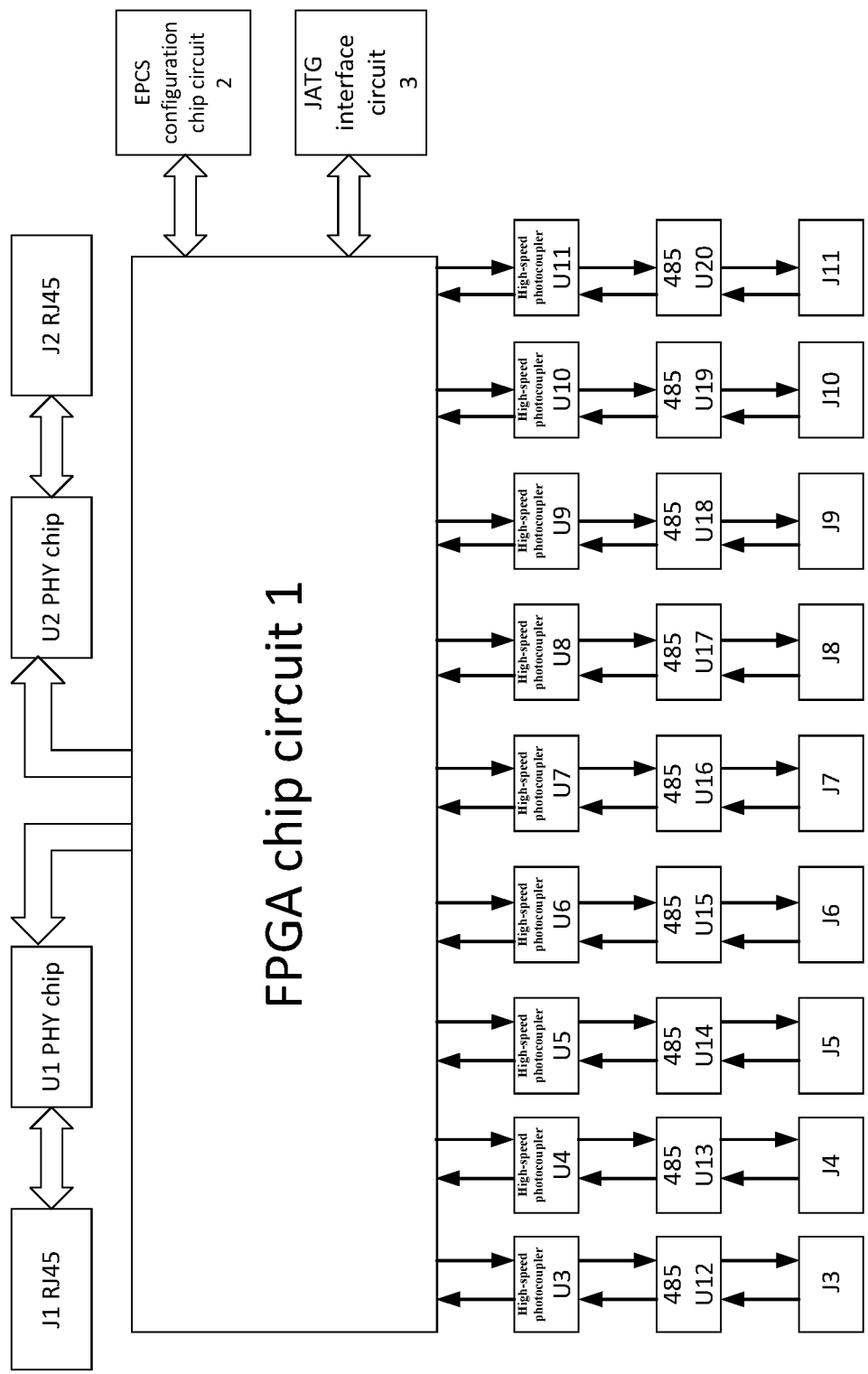
FIG. 2 is a circuit principle block diagram according to the present invention.

As shown in FIG. 1 and FIG. 2, a transmission system for converting a signal of a 9-channel encoder into a 1000 Mbps PHY signal includes PHY chip circuits U1 and U2, digital photocouplers U3~U11, 485 transceivers U12~U20, RJ45 isolation transformer-integrated jacks J1 and J2, an FPGA chip circuit 1, an EPCS configuration chip circuit 2, a Jtag interface 3 and SM-6P-PCB sockets J3~J11, wherein two-channel MII (Media Independent Interface) digital signal output and input ends of the FPGA chip circuit 1 are respectively connected with Mil digital signal input and output ends of the PHY chip circuits U1 and U2; differential, data signal output and input ends of the PHY chip circuits U1 and U2 are respectively connected to the RJ45 isolation transformer-integrated jacks J1 and J2; first-channel 485 digital signal input and output ends of the FPGA chip circuit 1 are connected with digital signal output and input ends of the 485 transceiver U12 through the digital photocoupler U3, second-channel 485 digital signal input and output ends of the FPGA chip circuit 1 are connected with digital signal output and Input ends of the 485 transceiver U13 through the digital photocoupler U4, third-channel 485 digital signal input and output ends of the FPGA chip circuit 1 are connected with digital signal output and input ends of the 485 transceiver U14 through the digital photocoupler U5, fourth-channel 485 digital signal input and output ends of the FPGA chip circuit 1 are connected with digital signal-output and input ends of the 485 transceiver U15 through the digital photocoupler U6, fifth-channel 485 digital signal input and output ends of the FPGA chip circuit 1 are connected with digital signal output and input ends of the 485 transceiver U16 through the digital photocoupler U7, sixth-channel 485 digital signal input and output ends of the FPGA chip circuit 1 are connected with digital signal outputting/inputting ends of the 485 transceiver U17 through the digital photocoupler U8, seventh-channel 485 digital signal input and output ends of the FPGA chip circuit 1 are connected with digital signal output and input ends of the 485 transceiver U18 through the digital photocoupler U9t eighth-channel 485 digital input and output-ends of the FPGA chip circuit 1 are connected with digital signal output and input ends of the 485 transceiver U19 through the digital photocoupler U10, ninth-channel 485 digital signal input and output ends of the FPGA chip circuit 1 are connected with digital signal output and input ends of the 485 transceiver U20 through the digital photocoupler U11, serial data input and output ends of the FPGA chip circuit 1 are connected with serial data output and input ends of the EPGS configuration chip circuit 2, and Jtag test data output and input ends of the FPGA chip circuit 1 are connected to the Jtag interface 3; 485 communication data output and input ends of the 485 transceivers U12~U20 are respectively connected to the SM-6P-PCB jacks J3~111; and the 485 transceivers UI 2-1.120 adopt an isolated power supply.

The model of the PHY chip circuits U1 and U2 is 88E1111, the digital photocouplers U3~U11 are digital complementary metal oxide semiconductor transistor (CMOS) photocouplers having a model of ACPL-064L/K64L and low power consumption of 10 MBd, the model of the 485 transceivers U12~U20 IS ADM485, the model of the RJ45 isolation transformer-integrated jacks J1 and J2 is HR11102A, and the model of the EPCS configuration chip circuit 2 is EPCS16S18N; the FPGA chip circuit 1 is an EP4CE6E144 programmable logic device.

A working principle: the work process of transmission for converting a signal of a 9-channel encoder into a 1000 Mbps PHY signal is as follows: FPGA controls data reception and transmission of an RS485 circuit and a PHY circuit of master and slave stations through an inquire breaking method. At one side close to the body of the robot, a circuit board is used for connecting the encoder, and at one side close to the control cabinet, an identical circuit board is used for connecting with the driver. The two circuit boards are communicated using a network cable. In order to conveniently distinguish circuits, the circuit board near the body of the robot is called the slave station, and the circuit board near the control cabinet is called the master station. The work flow procedure is as follows: after an interrupt signal is detected to be valid, the master station FPGA control circuit pulls up a transmission enable pin of the PHY chip U1 to initiate 1000 Mbps transmission of the PHY chip U1 to send out a data signal received by RS485 through the PHY chip U1, a data transmission state of the PHY chip U1 is ended after 9 channels of data are transmitted, and the transmission enable position of the master station PHY chip U1 is set as 0. Meanwhile, the master station will initiate data reception of RS485 and stores the data to detect a data transmission instruction of the driver, sends out the stored data through the MAC protocol when receiving the data transmission instruction in a direction of the PHY chip U2, and ends the data transmission state after data transmission is completed. When a slave station circuit detects that any one of data reception bits of the PHY chip U1 has a falling edge, a control signal in a corresponding RS485 direction is pulled up to send out the data received by the PHY chip U1 through a corresponding RS485 circuit. The interrupt signal is generated after data transmission is completed, and after FPGA detects that completion of transmission of slave station RS485 is interrupted, a direction control pin is pulled down to the data reception state; when the falling edge of the slave station RS485 reception signal is detected, the data is assigned to a corresponding transmission signal of the slave station PHY chip U1, meanwhile, the data transmission signal of the slave station chip U1 is set as 1, and 1000 Mbps transmission of the slave station PHY chip U1 is initiated; after transmission of all the data is completed, the transmission enable signal of the slave station PHY chip U1 is set as 0, and transmission is stopped. The PHY chip U1 of the master station detects that when the reception enable signal is 1, a pin in a corresponding slave station RS485 direction is set as 1 to send data to the driver, and the direction control pin of the master station RS485 is pulled down after transmission of 9 channels of data is completed, so that the master station RS485 is in a data reception state. Meanwhile, the master station will initiate data reception of RS485 and stores the data to detect the data transmission instruction of the driver, sends out the stored data when receiving the data transmission instruction in the direction of the PHY chip U2, and ends the data transmission state after data transmission is completed. Until now, one data reception and transmission flow procedure is completed. Reception and transmission pins of RS485 are respectively connected with data reception and transmission pins of the PHY chip U1 through logic control to achieve a purpose of converting a signal of a 9-channel encoder into a 1000 Mbps PHY signal for transmission, and delay is greatly reduced.

We claim:

1. A transmission system for converting a signal of a 9 channel encoder into a 1000 Mbps PHY signal, comprising
PHY chip circuits (U1, U2),
digital photocouplers (U3-U11),
RS485 transceivers (U12-U20),
RJ45 isolation transformer-integrated jacks (J1, J2),
a field programmable gate array (FPGA) chip circuit (1),
an electronic propulsion control system (EPCS) configuration chip circuit (2),
a Jtag interface (3) and
SM-6P-PCB sockets (J3-J11),
wherein two-channel MII (Media Independent Interface) digital signal output and input ends of the FPGA chip circuit (1) are respectively connected with MII digital signal input and output ends of the PHY chip circuits (U1, U2);
differential data signal output and input ends of the PHY chip circuits (U1, U2) are respectively connected to the RJ45 isolation transformer-integrated jacks (J1, J2);
first-channel RS485 digital signal input and output ends of the FPGA chip circuit (1) are connected with digital signal output and input ends of the RS485 transceiver (U12) through the digital photocoupler (U3),
second-channel RS485 digital signal input and output ends of the FPGA chip circuit (1) are connected with digital signal output and input end of the RS485 transceiver (U13) through the digital photocoupler (U4),
third-channel RS485 digital signal input and output ends of the FPGA chip circuit (1) are connected with digital signal output and input ends of the RS485 transceiver (U14) through the digital photocoupler (U5),
fourth-channel RS485 digital signal input and output ends of the FPGA chip circuit (1) are connected with the digital signal output and input ends of the RS485 transceiver (U15) through the digital photocoupler (U6),
fifth-channel RS485 digital signal input and output ends of the FPGA chip circuit (1) are connected with digital signal output and input ends of the RS485 transceiver (U16) through the digital photocoupler (U7),
sixth-channel RS485 digital signal input and output ends of the FPGA chip circuit (1) are connected with digital signal output and input ends of the RS485 transceiver (U17) through the digital photocoupler (U8),
seventh-channel RS485 digital signal input and output ends of the FPGA chip circuit (1) are connected with digital signal output and input ends of the RS485 transceiver (U18) through the digital photocoupler (U9),
eighth-channel RS485 digital input and output ends of the FPGA chip circuit (1) are connected with digital signal output and input ends of the RS485 transceiver (U19) through the digital photocoupler (U10),
ninth-channel RS485 digital signal input and output ends of the FPGA chip circuit (1) are connected with digital signal output and input ends of the RS485 transceiver (U20) through the digital photocoupler (U11),
serial data input and output ends of the FPGA chip circuit (1) are connected with serial data output and input ends of the EPGS configuration chip circuit (2),
and Jtag test data output and input ends of the FPGA chip circuit (1) are connected to the Jtag interface (3);
RS485 communication data output and input ends of the RS485 transceivers (U12-U20) are respectively connected to the SM-6P-PCB jacks (J3-J11);
the RS485 transceivers (U12-U20) adopt an isolated power supply; and
1-10 channels of signals are converted into PHY signals for transmission.

2. The transmission system according to claim 1, further comprising a first circuit board for connecting with an encoder and a second circuit board for connecting with a driver, wherein the first circuit board for connecting the encoder is arranged at one side close to a body of a robot, which is called a slave station;
the second circuit board for connecting with the driver is arranged at one side close to a control cabinet, which is called a master station; and
the first circuit board and the second circuit board are connected through a network cable.

* * * * *